(12) United States Patent
Liao et al.

(10) Patent No.: US 7,889,410 B2
(45) Date of Patent: Feb. 15, 2011

(54) DYNAMIC APERTURE DEVICE AND PROJECTOR WITH THE SAME

(75) Inventors: Li-Chun Liao, Taoyuan Hsien (TW); Chun-Wei Liang, Taoyuan Hsien (TW); Ching-Hsiang Yu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 523 days.

(21) Appl. No.: 12/057,925

(22) Filed: Mar. 28, 2008

(65) Prior Publication Data

US 2009/0109514 A1    Apr. 30, 2009

(30) Foreign Application Priority Data

Oct. 26, 2007    (TW) .............................. 96140386 A

(51) Int. Cl.
*G02B 26/02*    (2006.01)

(52) U.S. Cl. ..................................... 359/234
(58) Field of Classification Search ................. 359/230, 359/232–236
See application file for complete search history.

(56) References Cited

U.S. PATENT DOCUMENTS 6,280,059 B1 *    8/2001    Ito et al. ...................... 362/269
7,373,898 B1 *    5/2008    Tenka .......................... 116/328

\* cited by examiner

*Primary Examiner*—Euncha P Cherry
(74) *Attorney, Agent, or Firm*—Muncy, Geissler, Olds & Lowe, PLLC

(57) ABSTRACT

A dynamic aperture device includes a motor, a light shielding element and a balancer. The motor has a shaft. The light shielding element has a light shielding portion and a hub connected to the light shielding portion. The hub is coupled to the shaft. The balancer is disposed on the light shielding element, the hub or the shaft.

21 Claims, 4 Drawing Sheets

DYNAMIC APERTURE DEVICE AND PROJECTOR WITH THE SAME

CROSS REFERENCE TO RELATED APPLICATIONS

This Non-provisional application claims priority under 35 U.S.C. §119(a) on Patent Application No(s). 096140386 filed in Taiwan, Republic of China on Oct. 26, 2007, the entire contents of which are hereby incorporated by reference.

BACKGROUND OF THE INVENTION

1. Field of Invention

The invention relates to an aperture device of a projector and, in particular, to a dynamic aperture device and a projector including the same.

2. Related Art

In the optical apparatuses, such as the front projectors, rear projectors or cameras, the control mechanism of the light flux for generating image with different brightness is indispensable. Take a projector as an example. The light source module generates a monochromatic light, and then the monochromatic light is transmitted to a color wheel to generate color light. The light flux of the monochromatic light or the color light must be adjusted continuously so as to obtain the proper brightness, thereby fitting the requirement of contrast. Therefore, a dynamic aperture device is disclosed for adjusting the light flux continuously so as to improve the image quality.

The light shielding portion and the light permeable portion of the conventional aperture device are not completely symmetric. However, the color wheel is driven by a motor to rotate, so that the conventional aperture device may have vibrations due to the non-balance design. This may cause the malfunction of the conventional aperture device. In addition, since the light shielding surface is irradiated by the light, the heat may be generated and transferred to the motor through the shaft. This may lead to the overheating of the motor and make the motor malfunction, so the heat dissipation is also an important issue.

Therefore, there is a need to provide an aperture device that can provide good heat isolation effect and keep the rotation balance to decrease the vibration and steadily control the light flux.

SUMMARY OF THE INVENTION

In view of the foregoing, an object of the present invention is to provide an aperture device and a projector including the same that have a balancer and a position sensor to help to decrease the vibration and precisely control the rotation position of the light shielding element.

In addition, another object of the present invention is also to provide a projector and a dynamic aperture device thereof that have the heat isolation effect so as to protect the motor from being overheated.

To achieve the above, the invention discloses a dynamic aperture device including a motor, a light shielding element and a balancer. The motor has a shaft. The light shielding element has a light shielding portion and a hub connected to the light shielding portion. The hub is coupled to the shaft. The balancer is disposed on the light shielding element.

As mentioned above, the dynamic aperture device of the invention utilizes the balancer to balance the weight of the light shielding element, thereby keeping the balance of rotation and decreasing the vibrations. In addition, a position sensor is configured to detect the initial position of the light shielding element so as to precisely control the light flux. Moreover, a thermal-isolating material is disposed on the hub for preventing heat from being transferred into the motor so as to protect the motor from being overheated. Compared with the prior art, the vibrations of the dynamic aperture device of the invention can be restrained and the light flux can be controlled precisely, thereby enhancing the stability of the dynamic aperture device. Furthermore, the heat can be prevented from entering into the motor so as to extend the lifetime of the dynamic aperture device.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
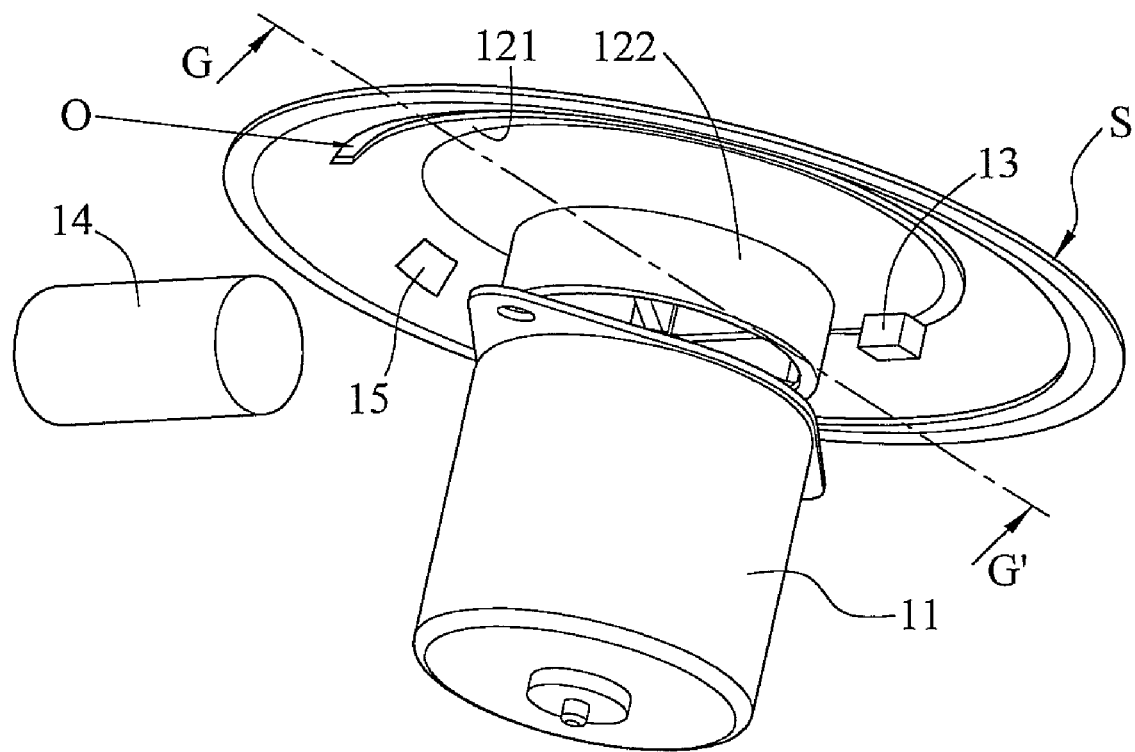
FIG. 1A is a schematic illustration showing a dynamic aperture device according to a preferred embodiment of the present invention.
Figure 1B:
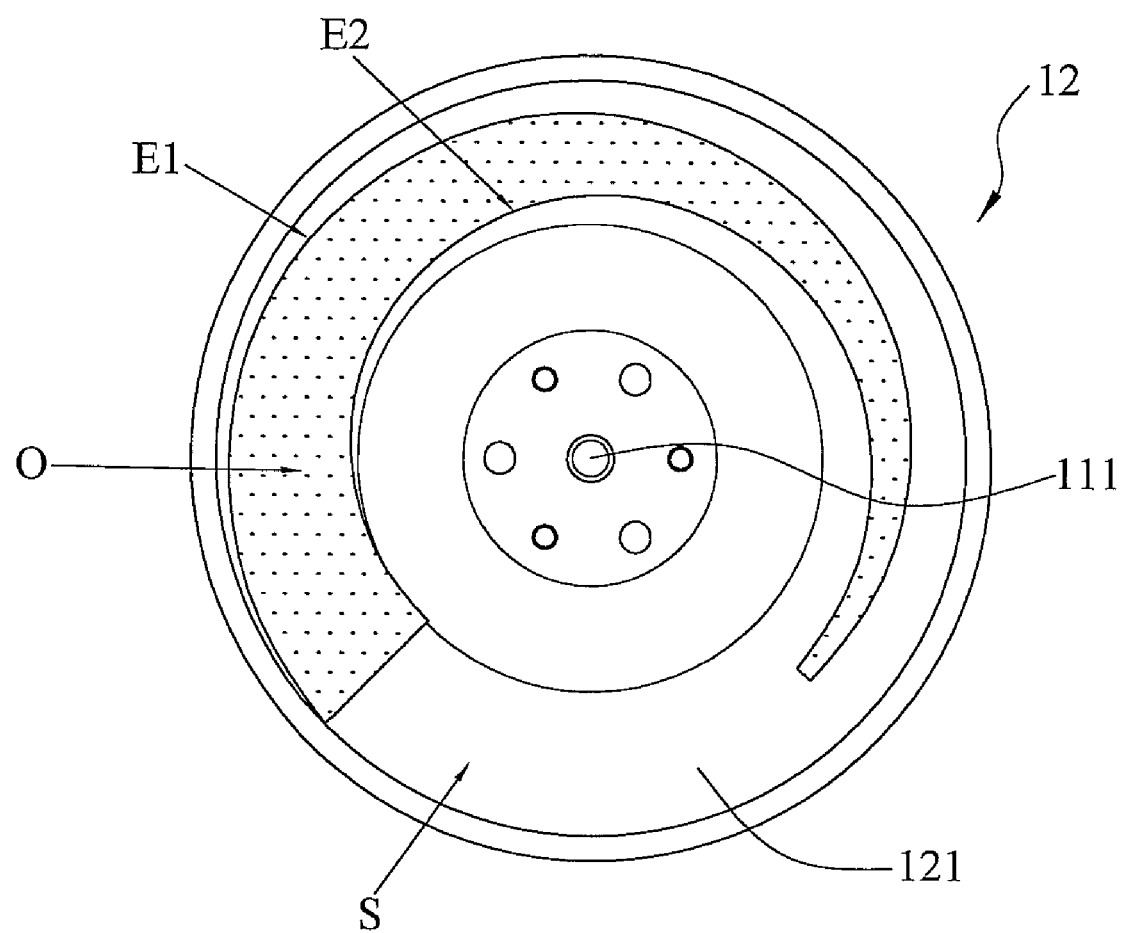
FIG. 1B is a front view of the dynamic aperture device of FIG. 1A.
Figure 1C:
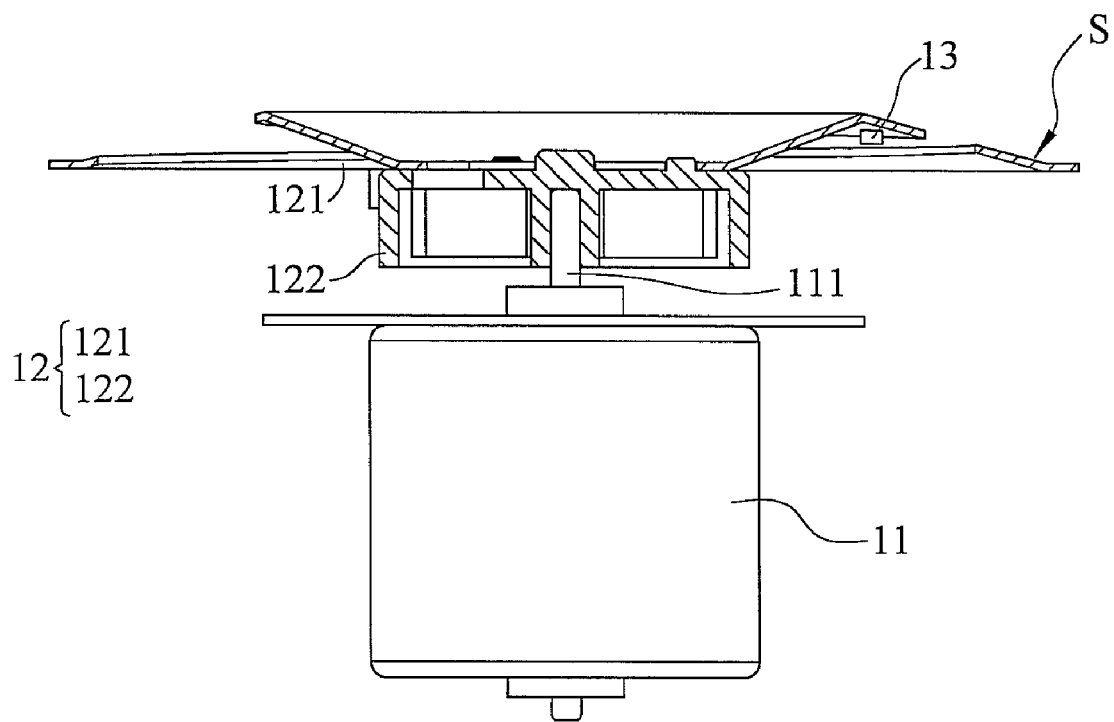
FIG. 1C is a sectional view along the line G-G' of FIG. 1A.

With reference to FIGS. 1A to 1C, a dynamic aperture device 1 according to a preferred embodiment of the invention includes a motor 11, a light shielding element 12 and a balancer 13. The dynamic aperture device 1 can be applied to a projector, camera or other apparatuses for controlling the light flux. The light shielding element 12 has a light shielding portion 121 and a hub 122 connected with the light shielding portion 121. The motor 11, such as a stepping motor, includes a shaft 111, and the hub 122 is coupled to the shaft 111. The light shielding portion 121 has an aperture O for controlling the light flux. In the embodiment, the aperture O of the light shielding portion 121 has a first edge E1 and a second edge E2 disposed around an axis of the light shielding portion 121. A distance between any point of the first edge E1 and the axis of the shaft 111 is larger than or equal to a distance between any point of the second edge E2 and the axis of the shaft 111. Accordingly, the aperture O is gradually reduced along a counterclockwise or clockwise direction.

In addition, the light shielding portion 121 has a light-input surface S, which includes a reflective material such as silver, chromium or an alloy thereof. To be noted, the light shielding portion 121 can be totally made of the reflective material, or be made of any material with the reflective material coated on a surface thereof. The reflective material can decrease the heat generated by the light entering the light shielding portion 121. Since the aperture O of the light shielding portion 121 is gradually reduced, it is necessary to dispose the balancer 13 on a proper position on the light shielding element 12, thereby making the rotation of the light shielding element 12 smoother, maintaining the rotation balanced and decreasing the vibrations. The balancer 13 can be regular or irregular, and the shape thereof can be lump, stripe-like or pellet like. In addition, the balancer 13 can be disposed at the inner or outer side of the light shielding portion 121 or the hub 122. Alternatively, the balancer 13 can be disposed on the shaft 111 of the motor 11. In the embodiment, the balancer 13 is lump and is disposed at the outer side of the light shielding portion 121. The balancer 13 is disposed on the light shielding element 12 in advance for pre-balance, and then the motor 11 and the light shielding element 12 are assembled. To be noted, the materials of the balancer 13 and the light shielding element 12 can be the same or different.

Furthermore, the hub 122 includes a thermal-isolating material for preventing the heat from being transferred into the dynamic aperture device 1. In the embodiment, the thermal-isolating material is coated on the surface of the hub 122. Alternatively, the hub 122 can be made of the thermal-isolating material such as the plastic material or ceramic material. Accordingly, the heat can be prevented from being transferred into the motor 11 that causes the malfunction thereof.

The dynamic aperture device 1 further includes a timing index mark (TIM) 15 and a position sensor 14. The TIM 15 is disposed on the light shielding portion 121 or the hub 122 of the light shielding element 12, at least includes a straight edge. In the embodiment, the TIM 15 is disposed on the light shielding portion 121, and the shape thereof is rectangular. The position sensor 14 is disposed adjacent the light shielding portion 121 or the hub 122 of the light shielding element 12 by adhering or baking enamel, so that the position sensor 14 and the TIM 15 are disposed corresponding to each other. When the motor 11 drives the light shielding element 12, the rotation of the light shielding element 12 can control the light flux and distribution of the light entering the dynamic aperture device 1. In addition, the position sensor 14 can sense the position of the TIM 15 so as to detect the initial position of the light shielding element 12, thereby identifying the position of the rotating light shielding element 12.

Figure 2:
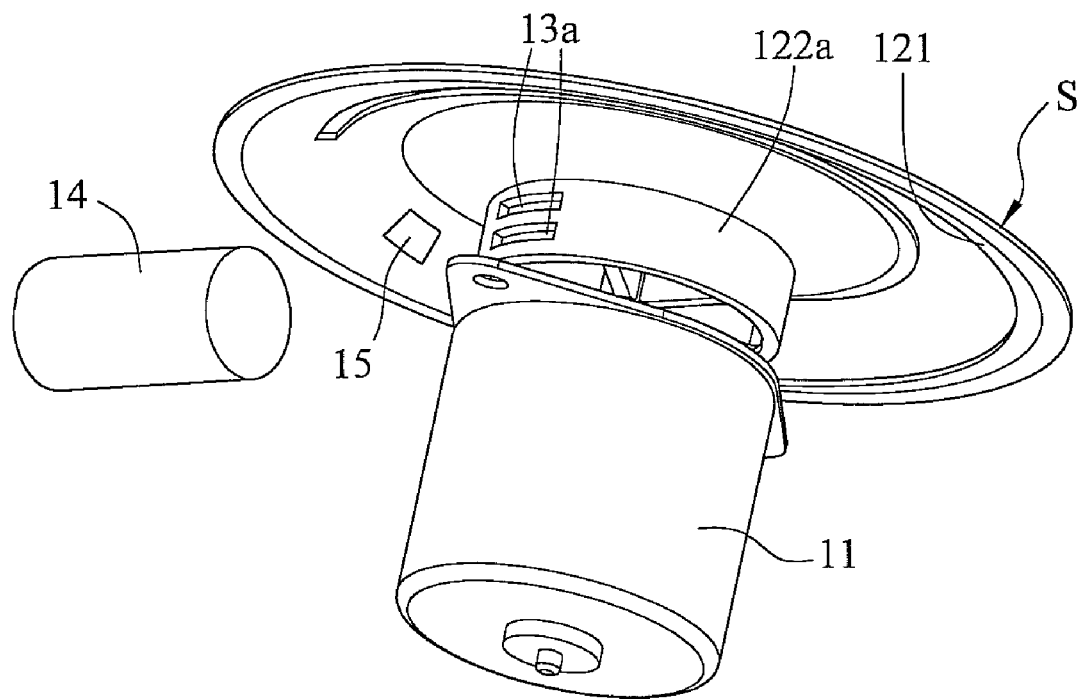
FIG. 2 is a schematic illustration showing another dynamic aperture device according to the preferred embodiment of the present invention.

With reference to FIG. 2, another dynamic aperture device 1a according to the embodiment of the invention includes a motor 11, a light shielding element 12a and a balancer 13a. The basic structure and function of the dynamic aperture device 1a are similar to those of the above-mentioned dynamic aperture device 1, so the detailed descriptions are omitted. The difference between the dynamic aperture devices 1 and 1a is in that the weight balance of the dynamic aperture device 1a is performed by removing a part of the light shielding element 12a. Herein, the balancer 13a is disposed on a hub 122a of the light shielding element 12a, and the balancer 13a is, for example, a recess. Alternatively, the balancer 13a can be formed by thinning a part of the hub 122a. Therefore, the light shielding element 12a can be balanced during rotation.

In summary, the dynamic aperture device of the invention utilizes the balancer to balance the weight of the light shielding element, thereby keeping the balance of the rotation decreasing the vibrations. In addition, a position sensor is configured to detect the initial position of the light shielding element so as to precisely control the light flux. Moreover, a thermal-isolating material is disposed on the hub for preventing heat from being transferred into the motor so as to protect the motor from being overheated. Compared with the prior art, the vibrations of the dynamic aperture device of the invention can be restrained and the light flux can be controlled precisely, thereby enhancing the stability of the dynamic aperture device. Furthermore, the heat can be prevented from entering into the motor so as to extend the lifetime of the dynamic aperture device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A dynamic aperture device comprising:
   a motor comprising a shaft; and
   a light shielding element comprising a light shielding portion and a hub connected with the light shielding portion, wherein the motor drives the light shielding element to rotate, the hub is coupled to the shaft, and the light shielding portion has an aperture for allowing a light beam to pass through and a reflective material on a surface thereof for reflecting light.

2. The dynamic aperture device according to claim 1, wherein the light shielding portion is made of the reflective material or a non-reflective material with the reflective material formed on a surface thereof.

3. The dynamic aperture device according to claim 1, wherein the reflective material comprises silver, chromium or an alloy thereof.

4. The dynamic aperture device according to claim 1, further comprising a balancer disposed on the light shielding element or the shaft.

5. The dynamic aperture device according to claim 4, wherein the balancer is disposed at an outer side of the light shielding portion, an inner side of the light shielding portion or the hub.

6. The dynamic aperture device according to claim 4, wherein the balancer is formed on the hub by thinning or removing a part of the hub.

7. The dynamic aperture device according to claim 1, wherein a material of the balancer comprises metal or a plastic material, and a shape of the balancer is lump, stripe-like or pellet-like.

8. The dynamic aperture device according to claim 1, wherein the hub comprises a thermal-isolating material formed in the hub or on a surface thereof.

9. The dynamic aperture device according to claim 8, wherein the thermal-isolating material comprises a plastic material or a ceramic material.

10. The dynamic aperture device according to claim 1, wherein the aperture has a first edge and a second edge, and a distance between the first edge and an axis of the shaft is larger than or equal to a distance between the second edge and the axis of the shaft.

11. The dynamic aperture device according to claim 1, further comprising:
    a timing index mark (TIM) disposed on the light shielding element; and
    a position sensor disposed adjacent to the light shielding element.

12. The dynamic aperture device according to claim 11, wherein the position sensor is disposed adjacent the light shielding portion or the hub of the light shielding element, and the position sensor is disposed corresponding to the TIM.

13. The dynamic aperture device according to claim 11, wherein the TIM is disposed on the light shielding portion or the hub of the light shielding element by adhering or baking enamel.

14. A dynamic aperture device comprising:
    a motor comprising a shaft;
    a light shielding element comprising a light shielding portion and a hub connected with the light shielding portion, wherein the motor drives the light shielding element to rotate, the hub is coupled to the shaft, and the light shielding portion has an aperture for allowing a light beam to pass through; and a balancer disposed on the light shielding element or the shaft.

15. The dynamic aperture device according to claim 14, wherein the balancer is disposed at an outer side of the light shielding portion, an inner side of the light shielding portion or the hub.

16. The dynamic aperture device according to claim 14, wherein the balancer is formed on the hub by thinning or removing a part of the hub.

17. The dynamic aperture device according to claim 14, wherein a material of the balancer comprises metal or a plastic material, and a shape of the balancer is lump, stripe-like or pellet-like.

18. The dynamic aperture device according to claim 14, wherein the aperture has a first edge and a second edge, and a distance between the first edge and an axis of the shaft is larger than or equal to a distance between the second edge and the axis of the shaft.

19. The dynamic aperture device according to claim 14, wherein the hub comprises a thermal-isolating material formed in the hub or on a surface thereof.

20. The dynamic aperture device according to claim 19, wherein the thermal-isolating material comprises a plastic material or a ceramic material.

21. A dynamic aperture device comprising:

a motor comprising a shaft;

a light shielding element comprising a light shielding portion and a hub connected with the light shielding portion, wherein the motor drives the light shielding element to rotate, the hub is coupled to the shaft, the light shielding portion has an aperture for allowing a light beam to pass through, and the hub comprises a thermal-isolating material formed in the hub or on a surface thereof and comprising a plastic material or a ceramic material.

* * * * *